May 11, 1937.   K. K. LEDIG   2,080,140
METHOD OF PREPARING PEN POINTS
Filed Dec. 21, 1935
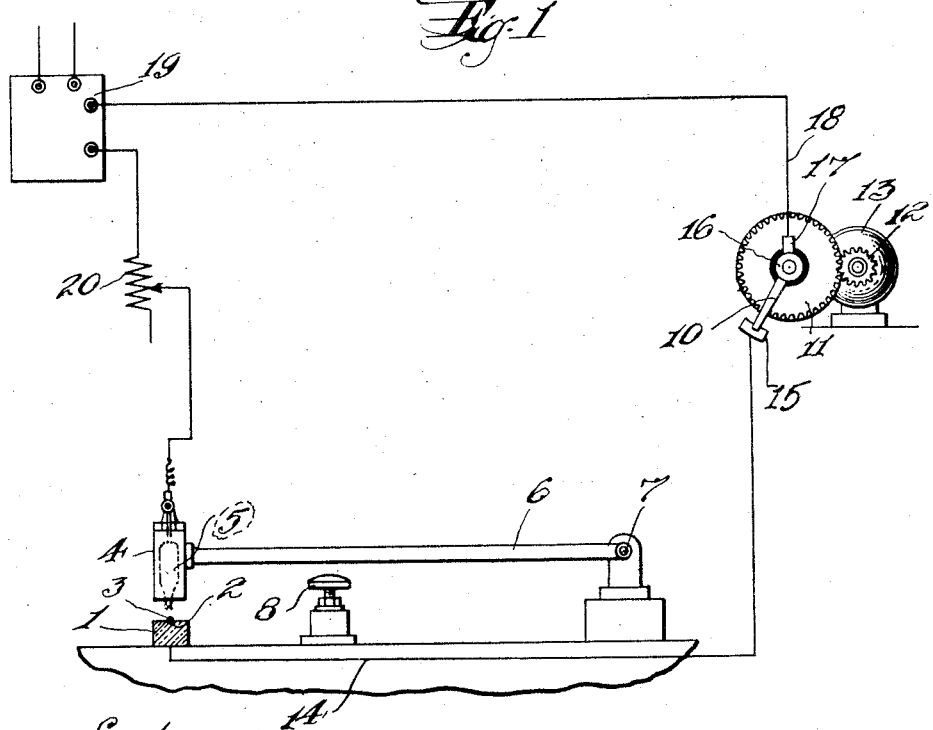
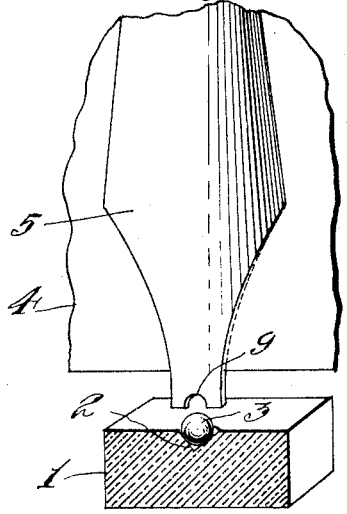
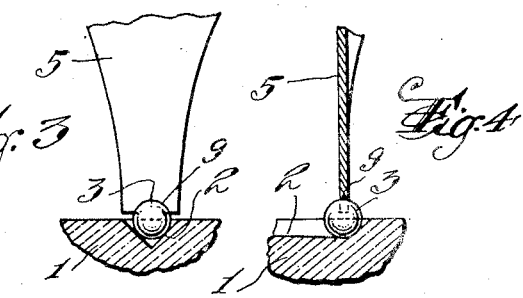
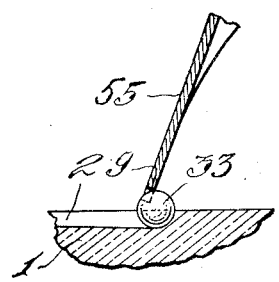
INVENTOR
Kurt K. Ledig.
BY Fredk C. Fischer
ATTORNEY Patented May 11, 1937

2,080,140

UNITED STATES PATENT OFFICE 2,080,140

METHOD OF PREPARING PEN POINTS

Kurt K. Ledig, Newark, N. J., assignor to American Platinum Works, Newark, N. J., a corporation of New Jersey Application December 21, 1935, Serial No. 55,541

3 Claims. (Cl. 219—10)

This invention relates to the manufacture of pen points and more particularly to the method and apparatus for attaching tips of iridium or similar metals to pen nibs.

In U. S. Letters Patent 2,005,752, issued on June 25, 1935 to Carl Pfanstiehl there is described a method of preparing pen points which is an improvement over methods heretofore used for attaching iridium to pen nibs. However, the method described in the above patent requires two or more steps such as first "tacking" a tip to a nib and then welding the tip and nib. The method requires the use of an electric arc and from 700 to 12,000 volts. These high voltages require special insulation and are not ordinarily safe to work with.

It is an object of this invention to provide a method and apparatus for attaching tips to pen nibs which can be performed with a current at comparatively low voltage, preferably from 2 to 30 volts, and in one operation.

A further object is the provision of a method with which a pen nib is caused to lightly contact a tip of iridium or similar metal and then causing a current at from 2 to 30 volts to be passed for a predetermined length of time through the nib and tip to cause a substantial welding of the tip to the nib.

A further object is the provision of an apparatus for attaching tips of iridium or similar metal to pen nibs which includes means for bringing a pen nib into light contact with a tip, means for automatically centering the nib with respect to the tip, means for passing an electric current through the tip and nib to cause a substantial welding of the tip to the nib, and means for limiting the time of flow of the current through the tip and nib.

These and other advantageous objects, which will later appear, are accomplished by the simple and practical construction and arrangement of parts hereinafter described and exhibited in the accompanying drawing, forming part hereof, and in which:

Fig. 1 is a diagrammatic view of the apparatus for tipping a metallic nib with a metallic tip, Fig. 2 is an enlarged view showing portions of the metallic nib, a metallic tip, and a graphite supporting block for the tip, Fig. 3 is a front elevational view of a metallic nib in contact with a metallic tip, during the process of welding the tip to the nib, Fig. 4 is a side elevational view of the metallic nib in engagement with the metallic tip, and Fig. 5 is an enlarged view of a metallic nib having a metallic tip attached to one side thereof.

Referring to the drawing, in which the invention is diagrammatically illustrated, there is shown a block 1 of graphite or other suitable material having a groove 2 therein, in which is positioned a tip 3 of iridium or similar material. The block 1 is preferably made of graphite so that during the passage of current through the block and tip there will be no tendency of the graphite block to adhere to the tip. The tip 3 is preferably preformed in a spherical shape; however, an irregular shape can be used.

Positioned vertically above the tip 3 and the graphite block 1 is a suitable metallic clamp 4 which supports a pen nib 5. The block 4 is mounted on an arm 6 pivoted at 7, the downward movement of the arm being limited by stops 8. The pen nib 5 is provided with an arcuate recess 9 at the tip thereof so that when it is brought into contact with the iridium tip 3, the latter will be automatically centered with respect to the pen nib 5. The graphite block is electrically connected by a wire 14 to an arcuate contact 15 of a timing device which, for example, can comprise a rotating arm 10 mounted upon a gear 11 which is in mesh with a small gear 12 mounted upon the shaft of an electric motor 13. The gear 11 is provided with a circular disc or collar 16 which is in constant contact with a brush 17 which is connected by a wire 18 to the secondary of the transformer 19, the secondary of the transformer being connected through an adjustable resistance 20 to the block 4. The above described timing device is merely by way of example; and obviously other forms of timing devices can be used without departing from the spirit of the invention.

In operation, the arm 6 is moved downwardly to bring the pen nib 5 into light contact with the tip 3, the recess 9 in the pen nib automatically centering the tip with respect to the nib. It is necessary that the contact be light and limited so that during the welding operation an excess of the metal adjacent the recess 9 will not flow around the sides of the tip 3. The limiting of the degree of contact between the nib 5 and the tip 3 is accomplished by means of the stop 8 which obviously limits the extent to which the arm 6 can be moved downwardly. After the nib has come into contact with the tip 3, the circuit is closed to place the timing device into operation and the arm 10 will engage the contact 15 for a predetermined length of time which causes a current at from 2 to 30 volts to flow through the nib and tip, producing a substantial welding of the tip to the nib.

During the initial flowing of the current, the metal at the extreme end of the nib 5 immediately begins to fuse causing a softening of the end of the nib 5 which causes the nib 5 to move downwardly slightly; but the downward movement of the nib is controlled by the stop 8 so that the nib will move down just sufficient to enable a portion of the fused nib to engage the tip 3 a short distance along the sides thereof.

It will be seen that the current is not passed through the nib and tip until they are in actual contact and consequently no arc is formed to cause an excess heating of the pen nib 5. Excess heating is also prevented by limiting the time of the passage of current through the nib 5 and the tip 3. According to the method herein described, obviously less metal is required to be heated and consequently there is less heating of the nib 5, thereby keeping the nib below the annealing temperature.

By providing the block 1 of graphite, welding of the tip 3 to the block 1 is prevented, as would be the case were a metal block employed.

The pen nibs 5 are made with the recess 9 formed in one end thereof.

From the above description it will be seen that there has been provided a simple and economical method and apparatus for conveniently and effectively attaching tips of iridium or similar material to pen nibs. The method requires an alternating or direct current at approximately 2 to 30 volts, which necessitates no special insulation.

In Fig. 1, although the nib 5 moves in an arcuate path due to its support at the end of the arm 6, the arc is so great that the nib substantially moves in a straight line vertically downward. In fact, at the time the nib 5 engages tip 3, the nib 5 is moving in a line vertical to the tip 3.

In Fig. 5 there is shown a modified form of the invention in which nib 55 is caused to engage the tip 33 on a line at an angle to the vertical. By means of this arrangement, the tip 33 will be attached to one side of the nib 55 as shown in Fig. 5, which is the common practise at present in the manufacture of pen points.

The metallic tip is preferably attached to the metal nib in a reducing atmosphere, such as a stream of hydrogen or other suitable ionizable gas, in a manner which is well known in this art.

The foregoing disclosure is to be regarded as descriptive and illustrative only, and not as restrictive or limitative of the invention, of which obviously embodiments may be constructed including many modifications, without departing from the general scope herein indicated and denoted in the appended claims.

Having thus described my invention, what I claim as new and desire to secure by Letters Patent, is:

1. The method of tipping a metallic nib with a metallic tip, comprising forming the end of the nib to be tipped with a recess, bringing said recessed end of the nib into engagement with the tip to cause an automatic centering of the tip with respect to said nib, and then passing an electric current through said nib and tip for a predetermined period of time.

2. The method of tipping a metallic nib with a metallic tip, comprising forming the end of the nib to be tipped with a recess, bringing said recessed end of the nib into engagement with the tip to cause an automatic centering of the tip with respect to said nib, and then passing an alternating current of low voltage through said nib and tip for a predetermined period of time.

3. The method of tipping a metallic nib with a metallic tip, comprising forming the end of the nib to be tipped with a recess, bringing said recessed end of the nib into engagement with the tip to cause an automatic centering of the tip with respect to said nib, and then passing a current at from 2 to 30 volts through said nib and tip for a predetermined period of time.

KURT K. LEDIG.